No. 833,289. PATENTED OCT. 16, 1906.
E. C. BERNHEIM.
EYEGLASSES.
APPLICATION FILED JAN. 13, 1906.
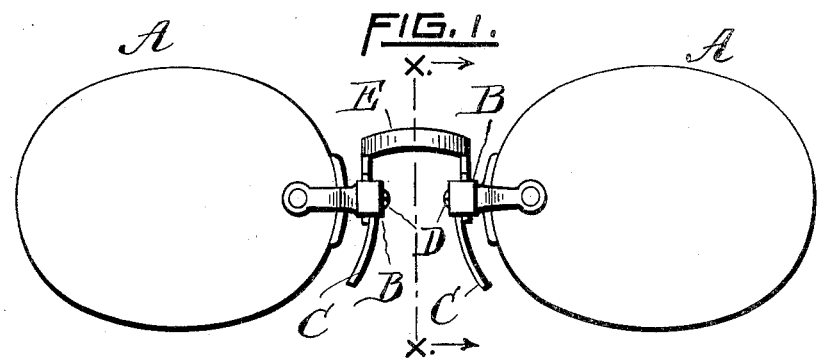
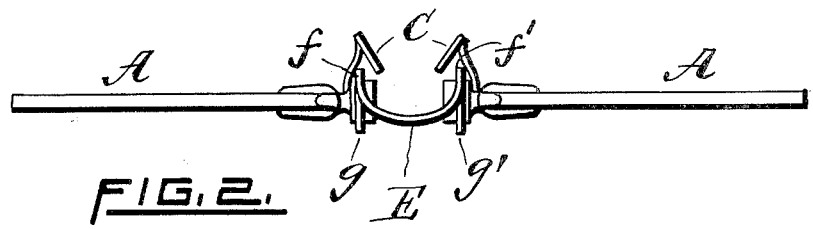
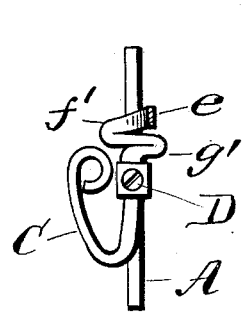
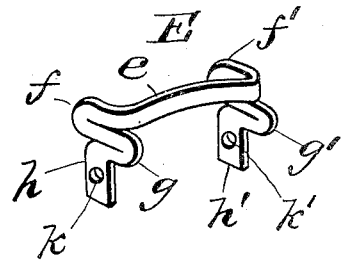
WITNESSES.
C. T. Hannigan
William H. Wright.
INVENTOR.
Eugene C. Bernheim
By Horatio E. Bellows
Atty.

UNITED STATES PATENT OFFICE.

EUGENE C. BERNHEIM, OF NEWARK, NEW JERSEY.

EYEGLASSES.

No. 833,289.  Specification of Letters Patent.  Patented Oct. 16, 1906.

Application filed January 13, 1906. Serial No. 295,881.

*To all whom it may concern:*

Be it known that I, EUGENE C. BERNHEIM, a citizen of the United States, residing at Newark, in the county of Essex and State of New Jersey, have invented certain new and useful Improvements in Eyeglasses, of which the following is a specification, reference being had therein to the accompanying drawings.

My invention relates to eyeglasses of all kinds, and has for its primary object a structure adapted to facile application to the nose at any angle or inclination—that is, possessing the capacity for opening or distension longitudinally, transversely, vertically, and obliquely—in short, possessing a universal action.

In the drawings which form a part of this specification, Figure 1 is a front elevation of a pair of eyeglasses embodying my invention; Fig. 2, a top plan view of the same; Fig. 3, a section on line $x$ $x$ of Fig. 1, and Fig. 4 a perspective detail of the novel bridge member.

Like reference characters indicate like parts throughout the views.

The invention is in this instance embodied in a pair of eyeglasses comprising the usual lenses A, posts or studs B, guards C, and screws D.

The bridge E, formed, preferably, from a flat metallic strip, comprises a comparatively stiff or rigid yoke or bow portion $e$, horizontally bowed and slightly arched. The strip at each end of the bow is bent into transversely-disposed folds $f$ $g$ and $f'$ $g'$, respectively, folds $f$ and $f'$ projecting rearwardly beyond the plane of the lenses, and folds $g$ and $g'$ projecting forwardly beyond the lenses plane. The flat surfaces of the strip constituting each series of folds lie in the same vertical plane, and the two fold series $f$ $g$ and $f'$ $g'$ lie in parallel vertical planes. The bridge is completed by bending the ends of the strip downwardly, whereby is formed two lugs $h$ and $h'$ integral with and in the plane of folds $g$ and $g'$, respectively. The lugs are provided with the openings or perforations $k$ and $k'$, respectively, to permit passage therethrough of the stud-screws D, which engage the bridge to the studs. Obviously these openings may be omitted if it is desired to fasten the bridge frictionally.

It will be observed that the yoke and its folds or active spring portions are above the centers of the studs and of the lenses, as well as above the uppermost part of the guard.

While the number of folds herein shown are two in each series, the number of folds may be increased without departing from the spirit of the invention. The folded portions of the bridge have sufficient resiliency to permit universal action; but their temper admits their being bent somewhat out of their vertical plane in a longitudinal direction. The folded form of the bridge readily lends itself to such longitudinal adjustment without detriment to any of its universal spring functions and without any bending or weakening of the arched portion.

What I claim is—

1. The combination with the lenses and studs of eyeglasses, of a bridge provided with resilient folds connecting the arched portion of the bridge with the studs, the folds lying wholly above the center of the studs.

2. The combination with the lenses and studs of eyeglasses, of a bridge provided with resilient folds connecting the arched portion of the bridge with the studs, the folds lying wholly above the centers of the studs and of the lenses.

In testimony whereof I have affixed my signature in presence of two witnesses.

EUGENE C. BERNHEIM.

Witnesses:
HORATIO E. BELLOWS,
WILLIAM H. WRIGHT.